United States Patent
Vylasek

(10) Patent No.: US 7,418,990 B2
(45) Date of Patent: Sep. 2, 2008

(54) TIRE WITH ACRYLIC POLYMER FILM

(76) Inventor: Stephan S. Vylasek, 2233 Palm Ave., Livermore, CA (US) 94550

(*) Notice: Subject to any disclaimer, the term of this patent is extended or adjusted under 35 U.S.C. 154(b) by 369 days.

(21) Appl. No.: 11/083,185

(22) Filed: Mar. 17, 2005

(65) Prior Publication Data

US 2006/0207708 A1    Sep. 21, 2006

(51) Int. Cl.
*B60C 13/00* (2006.01)
*C08J 7/04* (2006.01)

(52) U.S. Cl. ............... 152/524; 152/525; 156/116; 427/393.5

(58) Field of Classification Search ......... 152/524–525; 156/116; 427/393.5
See application file for complete search history.

(56) References Cited

U.S. PATENT DOCUMENTS

| | | | | |
|---|---|---|---|---|
| 4,136,075 A | * | 1/1979 | Finn et al. ............... | 524/561 |
| 4,684,420 A | | 8/1987 | Bryant et al. ............ | 156/116 |
| 5,567,756 A | * | 10/1996 | Swidler .................... | 524/389 |
| 5,693,704 A | * | 12/1997 | Estes ....................... | 524/506 |
| 5,891,525 A | * | 4/1999 | Chauffour et al. ........ | 427/387 |
| 6,030,676 A | | 2/2000 | Cottin et al. ............. | 428/64.1 |
| 6,369,128 B1 | | 4/2002 | Hunt et al. ............... | 523/161 |
| 2005/0058689 A1 | * | 3/2005 | McDaniel ................ | 424/426 |

FOREIGN PATENT DOCUMENTS

| | | |
|---|---|---|
| EP | 0649936 | 4/1995 |
| WO | WO-96/13547 A1 * | 5/1996 |

OTHER PUBLICATIONS

*Noveon* Carboset® 514H Technical Data Sheet (2 pages), 2003.
*Noveon* Carboset® 515 Technical Data Sheet (1 page), 2003.
*Noveon* Product Selection Guide (5 pages), undated.

* cited by examiner

*Primary Examiner*—Geoffrey L Knable
(74) *Attorney, Agent, or Firm*—Monahan & Moses, LLC; Timothy J. Monohan

(57) ABSTRACT

The sidewall of a tire is coated with an acrylic polymer, formed by application of an aqueous solution of the acrylic polymer and a volatile counter ion, which dries to form a non-tacky, glossy and water resistant film.

15 Claims, No Drawings

TIRE WITH ACRYLIC POLYMER FILM

BACKGROUND OF THE INVENTION

This invention relates to a tire having an acrylic polymer film coating, which is protective, durable and aesthetically pleasing, and a method for making the same. In particular, the outer surface of the sidewall (non-tread) portion of the tire is coated with an acrylic polymer film.

It is known to treat the sidewalls of tires with silicon oil (polydimethylsiloxanes), to improve the appearance of the tire. For example, the silicon oil gives a glossy appearance, temporarily providing a "like-new" look to the tire. While silicon oils are relatively inexpensive to use, they can attract dust and dirt to the tire surface and can be slung onto the painted surfaces of an automobile. When the silicon oil fully dries, the tires tend to lose their glossy appearance. Further, silicon oil may degrade over time and weaken the tire sidewall, where the oil has been applied.

In addition to treatments designed to provide the like-new look to tires, it has been disclosed to apply certain decorative elements to the sidewall of a tire. Bryant et al, U.S. Pat. No. 4,684,420, provide paint compositions suitable for forming decals which can be applied to vehicle tire sidewalls. The compositions comprise a saturated elastomer having a glass transition temperature not higher than −40° C., a pigment in the range of 0.5 to 10 times the weight of elastomer, and a solvent.

In U.S. Pat. No. 6,030,676, Cottin et al. disclose another example of decorative pigments applied to the sidewalls of tires. In the following order, an adhesive layer, a pigment layer and a transparent layer are applied to the tire. The polymers used in the adhesive and transparent layers may be homopolymers and copolymers having as base at least one monomer selected form the group consisting of acrylic, methacrylic and vinyl esters. The polymers are applied in the form of an aqueous emulsion.

Despite earlier efforts, there remains a need for an improved coating for the sidewalls of tires, which meets most, if not all of the following objectives. The coating should be easy to apply in a single step and bonded directly to the outer surface of the tire, without the need for an intermediate adhesive layer. The coating should be provided in the form of a low-viscosity, aqueous solution, which may be sprayed on as a fine mist, at relatively high solids concentration. The coating should be water-resistant, once it has dried on the surface of the tire. The coating should dry quickly to form a transparent, non-tacky and glossy surface, which is resilient to tire flexing and torque, and resistant to heat, without cracking or flaking.

SUMMARY OF THE INVENTION

The tire with an acrylic polymer film coating of the present invention can be prepared by the following procedure.

An acrylic polymer is dissolved in an aqueous solvent, in the presence of a counter ion, to form a solution. The acrylic polymer may be a homopolymer or copolymer. Further, the acrylic polymer is selected to have sufficient carboxylic acid functionality to become water soluble, in the presence of a suitable counter ion.

The solution may comprise a blend of two or more acrylic polymers. An advantage of creating a solution of the acrylic polymers is the ability to intimately mix the molecular weight distributions and other properties of two or more acrylic polymers, thereby tailoring the properties of the resulting film.

The acrylic polymer or polymer blend is formulated to achieve the requisite adhesion to the tire and flexibility, and to dry to a non-tacky and glossy finish.

The aqueous solution of the acrylic polymer is applied to the sidewall of the tire in sufficient quantity to fully wet the outer surface, and is allowed to dry. The water resistance of the coating may be significantly improved by employing a volatile counter ion in the solution, such as an ammonium ion, which evaporates leaving the free acid.

The concentration of acrylic polymer in the solution may be varied, depending on the desired application level. An advantage of the present invention is that the solution may be applied at acrylic polymer concentration levels ranging from 10 to 45 weight %, based on the weight of the solution. A further advantage is that the viscosity of the solution remains sufficiently low at ambient conditions to be applied as droplets, for example as a fine mist or spray.

Once the aqueous acrylic polymer solution is applied to the sidewall of the tire, for example with a spray bottle dispenser, it may be spread evenly around the sidewall of the tire with a suitable article, such as a cloth, swab or sponge. The solution is then allowed to dry on the tire, to form an acrylic polymer film. Another advantage of the process is that the film is bonded directly to the tire, without an intermediate adhesive layer, and the film is applied in a single process, i.e. uniformly applying the aqueous acrylic polymer solution to the outer surface of the sidewall.

When dry, the acrylic polymer forms a glossy, transparent film on the tire. The film is durable to changes in temperature and tire flexing, without peeling or cracking, yet the film is non-tacky. Dirt and road debris do not readily adhere to the film, so the tire sidewall stays clean longer. The film is not washed off by rain and standing water. Conveniently, however, the film may be removed, for example for a new application of an acrylic polymer film, by scrubbing with an alkaline cleaning solution. The film also acts as a barrier to oxidation and/or ozone degradation at the tire surface.

In one embodiment of the invention, the water resistance of the acrylic polymer film may be enhanced by incorporating a minor amount of a wax into the formulation. The wax is provided as an aqueous dispersion in water, which can be mixed into the aqueous acrylic polymer solution, and applied to the tire in a single application. It is believed that when the mixture dries, the hydrophobic wax particles migrate to the surface of the film, thereby increasing water resistance.

In an alternative embodiment of the invention, a coloring or reflective additive may be incorporated in the aqueous acrylic polymer solution, prior to application to a tire. If the additive is a particulate, its particle size should be reduced, so that the additive is stable during storage or can be readily suspended by shaking, and so that the additive does not clog spray nozzles. Examples of possible additives are carbon black particles, pearlescent particles, light-reflective particles, pigments, light dispersing glitter particles and water-soluble colorants. The coloring or reflective additive is typically incorporated into the aqueous acrylic polymer solution at concentrations of 0.05 to 10 weight %, based on the total weight of the solution, including insoluble particles.

DETAILED DESCRIPTION OF THE INVENTION

Unless otherwise indicated: all parts and percentages are by weight and conditions are ambient, i.e. one atmosphere of pressure, 25° C. and 50% relative humidity; aliphatic hydrocarbons and radicals thereof are from one to twelve carbon atoms in length; averages are based on the number average;

and mean particle size is the mean volume diameter of the distribution as measured by laser light diffraction.

All of the United States patents cited in the specification are hereby incorporated by reference.

A tire is a thick rubber ring, typically filled with air, fitted around the outer edge of a wheel. The rubber may be made of natural rubber or a synthetic elastomer, or combinations thereof. In addition to rubber, tire formulations typically include fillers, cross-linking agents, cure systems, such as activators, retarders and accelerators, as well as antioxidants and antiozonants. A more detailed list of tire compositions may be found in *The Rubber Formulary*, Ciullo, et al., ISBN 0-8155-1434-4 (1999).

The sidewall of the tire is the area between the tread, which comes in direct contact with the road, and the outer edge of the wheel or rim. The acrylic polymer film of the present invention is applied to the outer surface of the sidewall of a fully cured tire.

Acrylic polymers useful in the present invention are polymers of acrylic acid, methacrylic acid and maleic anhydride ("acid functionalized vinyl monomers"), and copolymers of such acid functionalized vinyl monomers, or mixtures thereof, with other vinyl or vinylidene containing monomers, in particular $C_{1-12}$ esters of acrylic acid, methacrylic acid and maleic anhydride (particularly $C_{1-4}$ esters), styrene and styrene derivative, such as alkylated styrenes. Good results were achieved using an acrylic copolymer of (i) acrylic acid or methacrylic acid; and (ii) a $C_{1-4}$ ester of acrylic acid or methacrylic acid.

The term "copolymer" is used in its broad sense to include polymer containing two or more different monomer units, such as terpolymers.

The acrylic polymer has sufficient carboxylic acid functionality to become water soluble, in the presence of a cationic counter ion. For example, acrylic polymers having an acid number 9 (mg KOH per gram of polymer) of from 25 to 80, typically 50 to 75, can be dissolved in an aqueous solvent, in the presence of a counter ion. Suitable counter ions include alkali metal ions, alkaline earth metal ions, zinc ammonium complexes, ammonium ions and amine salts, such as salts of morpholine. Especially useful are ammonium hydroxide and ammonium ions which may optionally be substituted with from one to three groups selected from $C_{1-18}$ alkyl, $C_{2-18}$ hydroxyalkyl, phenyl and alkylphenyl wherein the alkyl portion is $C_{1-4}$, such as amine salts of ethanolamine, diethanolamine and triethanolamine.

Addition of the counter ion in sufficient quantity to solubilize the acrylic polymer, was found to change the pH of the aqueous composition from slightly acidic to basic, i.e. to a pH greater than 7.0.

In an embodiment of the invention, the counter ion is volatile and will substantially evaporate from the aqueous acrylic polymer solution, within about one hour of application to a tire. For example, counter ions having a boiling point of 300° C. or less, preferably 100° C. or less, will evaporate in a reasonable period of time. When the counter ion is not present in the dried acrylic polymer film, the film is relatively insoluble in the presence of water, and is durable to ordinary use, such as an automobile driven in the rain and on wet roads.

Acrylic polymers may be characterized by a "glass transition temperature." The glass transition temperature of a polymer or $T_g$ is the temperature at which the mechanical behavior of the polymer evolves from this rigid, brittle vitreous behavior to a rubbery behavior. The glass transition temperatures are generally determined by differential enthalpy analysis, known as differential scanning calorimetry or by its acronym DSC. Differential scanning calorimetry consists of determining the variations in specific heat of a sample, as the temperature of the sample is increased. It makes it possible to show transitions or reactions which are accompanied by the liberation of energy (exothermal) or the absorption of energy (endothermal). For the purpose of this specification, $T_g$ is measured by DSC according to ASTM D3418-03, Standard Test Method for Transition Temperatures of Polymers by Differential Scanning Calorimetry.

An acrylic polymer film having a $T_g$ of from −30° C. to 45° C., particularly from −20° C. to 35° C., may be employed. Alternatively, the film of the present invention may be a blend of two or more acrylic polymers, for example a blend between an acrylic polymer having a $T_g$ of from −30 to 0° C., and a second acrylic polymer having a $T_g$ of from 15 to 45° C., which results in a the desired properties of adhesion, flexibility, gloss and non-tacky finish. When a blend of acrylic polymers is employed, an average $T_g$ may be calculated based on the weight % of each polymer in the blend, multiplied by the polymer's measured $T_g$, which can then be summed. The acrylic polymers may be advantageously blended to create an average $T_g$ of from −10° C. to 25° C., particularly from 0° C. to 15° C.

The acrylic polymer film should be non-tacky, once it has dried, up to and including a temperature 40° C. The absence (or presence) of tack may be determined by pressing a fingertip against the film and noting whether or not the film is sticky to the touch.

The aqueous solution of the acrylic polymer can be formulated over a wide range of polymer solids content, to accommodate the method of application and the desired thickness of the resulting film on the tire. For example, good results were achieved using a squeeze spray bottle dispenser with solution having an acrylic polymer solids content of between 15 and 40 weight %, based on the weight of the aqueous solution. Aqueous acrylic polymer solutions having a viscosity of 50 centipoises or less, at 25° C. may be used over a broad range of applications methods.

Minor amounts of water miscible organic co-solvents, such as $C_{1-8}$ alcohols and ethers may also be present in the aqueous solution. Additionally, the solution may contain small amounts of surface active agents to improve wetting, when the solution is applied to a tire.

In one embodiment of the invention, a wax is incorporated into the aqueous acrylic polymer solution, to improve the water resistance of the dried acrylic polymer film. Suitable waxes include paraffin wax, microcrystalline wax, natural waxes, such as carnauba wax, and polyethylene wax, such as linear low density polyethylene, high density polyethylene, as well as blends of any of the foregoing waxes. Additionally, minor amounts of other polyolefins, such as random and block copolymers of polypropylene and polyethylene, may also be incorporated into the waxes, to modify their physical properties, such as to increase their melting point.

Waxes, including wax blends, having a melting point of from 45° C. to 75° C. are believed to be particularly useful in improving the water resistance of the dried film, while providing the resilience and heat stability needed for applications on vehicle tires. Some migration of the wax to the surface of the acrylic polymer film may occur, which is likely to further improve the water resistance of the film.

The wax may be conveniently provided in the form of an aqueous dispersion, which can be easily mixed with the aqueous acrylic polymer solution, prior to application to a tire. For example, the wax may be dispersed in water, adjusted to a pH of greater than 7, by the addition of ammonia or other base. Adequate dispersions of the wax particles can be achieved by employing particles having a mean particle size of from 10 nanometers to 3 micrometers, in particular from 10 to 100 nanometers.

Dispersions of waxes may be formed by pressure emulsification techniques, such as those carried out at temperatures above the softening point of the wax. However, it is not intended that the invention be limited to any particular method of forming the dispersion. By way of example, Michememulsion #62330 (tradename) is available from Michelman, Inc., Cincinnati, Ohio, is a paraffin/polyethylene "emulsion" having a melting temperature of 141° C., and a mean particle size of about 35 nanometers, and may be employed in the present invention.

When it is desirable to incorporate a wax into the acrylic polymer film, the wax dispersion may be incorporated in the aqueous acrylic polymer solution in sufficient quantity to provide a wax concentration in the dried film of from 0.1 to 10 weight %, particularly from 0.5 to 6 weight %.

The aqueous acrylic polymer solution may be applied to the sidewall of a tire by virtually any method used to apply liquids to a solid surface. Accordingly, the solution may be applied by spraying or misting, or wiped on with a suitable applicator, such as a brush, cloth, swab or sponge. The solution can be spread around the sidewall of the tire, to provide a uniform application of the polymer, once the solution dries. Best results are obtained when the sidewall of the tire is cleaned prior to application of the aqueous acrylic polymer solution, for example with a detergent solution. Pinholes or minor imperfections in the film do not detract from its aesthetic and barrier property utilities.

The solution is then allowed to dry on the tire, thereby creating an acrylic polymer film. The thickness of the film may range from 0.05 to 2 mils, typically 0.1 to 1 mil. No special drying conditions are required, and the tire may be allowed to dry in the ambient air. Although it is not necessary, multiple coats of the acrylic polymer may be applied, by repeating the foregoing steps.

The invention may be further understood by reference to the following examples. As used throughout the specification with regard to the acrylic polymers, the term "aqueous solution" refers to the point at which the polymer dispersion becomes transparent.

EXAMPLE 1

An aqueous acrylic polymer solution is prepared according to the following procedure.

Acrylic polymer "A" is Carboset 514H (tradename), a 40% solids, acrylic colloidal dispersion copolymer in ammonia water, available from Novean, Inc., characterized by an acid number of 65, a $T_g$ of 28° C. and a pH of 6.7 to 7.0.

Acrylic polymer "B" is Carboset 515 (tradename), a 97% solids, low molecular weight acrylic copolymer dispersion, available from Novean, Inc., characterized by an acid number of 65 and a $T_g$ of –14° C.

Polymer A (109 kg) is added to a batch tank and diluted with deionized water (87 kg). Next, 4.0% aqueous ammonium hydroxide solution (14.2 kg) is slowly added to the dilute polymer dispersion, while the mixture is continuously agitated. The mixture changes from opaque to clear, and the pH changes from approximately 6.8 to 7.5.

In a separate batch tank, 1.6% aqueous ammonium hydroxide solution (130 kg) is added. Polymer B (44.9 kg) is heated to approximately 65 to 80° C., to reduce viscosity, and slowly added to the tank, while the mixture is continuously agitated. The mixture changes from opaque to clear.

The solutions containing Polymer A and Polymer B are then mixed together (50/50 solids basis) to provide an aqueous solution having solids content of 22% based on the weight of the solution. A surfactant, Surfonyl 104PA (tradename), available from Air Products and Chemicals, Inc. is added to the mixture at a loading a 0.5 weight %, based on the weight of the solution, to improve wetting, flow and sprayability, and to reduce foaming. The calculated average $T_g$ of the polymer blend was 7° C.

EXAMPLE 2

The aqueous acrylic polymer solution was applied to the sidewall of a clean automobile tire Michelin radial tires (black sidewall) by spraying with a squeeze spray bottle dispenser, until the sidewall was fully wetted. The solution was uniformly distributed on the sidewall surface with a sponge covered with a cotton fabric. The solution was allowed to dry at ambient conditions.

Within one hour, a dry, transparent, glossy acrylic polymer film was formed on the sidewall of the tire. The film was firmly adhered to the tire surface and showed no signs of cracking or peeling, after the automobile was taken for a test drive.

The invention may be further understood by reference to the following claims.

What I claim is:

1. A method of treating a tire, comprising the steps of:
   (a) uniformly applying an aqueous acrylic polymer solution to the outer surface of the sidewall of a tire, wherein the acrylic polymer solution comprises a blend of (i) a first acrylic polymer having a $T_g$ of from –30 to 0° C., and (ii) a second acrylic polymer having a $T_g$ of from 15 to 45° C., and wherein the acrylic polymers are solubilized in the aqueous solution by a volatile counter ion; and
   (b) allowing the solution to dry, whereby the counter ion evaporates, and the acrylic polymer forms a film adhered to the outer surface of the sidewall.

2. The method of claim 1, wherein the acrylic polymer blend has an average $T_g$ of from –20° C. to 35° C., and each of the first and second acrylic polymers has an acid number of from 25 to 80.

3. The method of claim 1, wherein the acrylic polymer blend has an average $T_g$ of from –10° C. to 25° C.

4. The method of claim 1, wherein the acrylic polymer blend has an average $T_g$ of from 0° C. to 15° C.

5. The method of claim 1, wherein the aqueous acrylic polymer solution further comprises a wax dispersed therein.

6. The method of claim 5, wherein the wax comprises 0.1 to 10 weight % of the dry film.

7. The method of claim 1, wherein the aqueous acrylic polymers solution has a solids content of 15 to 40 weight % and wherein the counter ion is an ammonium ion.

8. A tire having an acrylic polymer film, which is the product of the process of claim 1.

9. A tire having an acrylic polymer film, which is the product of the process of claim 3.

10. A tire having an acrylic polymer film, which is the product of the process of claim 6.

11. A method of treating a tire, comprising the steps of:
    (a) uniformly applying an aqueous acrylic polymer solution to the outer surface of the sidewall of a tire, wherein the acrylic polymer solution comprises a blend of (i) a first acrylic polymer having a $T_g$ of from –30 to 0° C., and (ii) a secondacrylic polymer having a $T_g$ of from 15 to 45° C., and wherein the acrylic polymers are solubilized in the aqueous solution by a volatile counter ion, and further wherein the first and second acrylic polymers are copolymers of (i) acrylic acid or methacrylic acid; and (ii) a $C_{1-4}$ ester of acrylic acid or methacrylic acid, and each of the acrylic polymers has an acid number of from 25 to 80; and (b) allowing the solution to dry, whereby the counter ion evaporates, and the acrylic polymer forms a film adhered to the outer surface of the sidewall.

12. The method of claim 11, wherein the aqueous acrylic polymer solution further comprises a wax dispersed therein.

13. The method of claim 12, wherein the wax comprises 0.1 to 10 weight % of the dry film.

14. The method of claim 13, wherein the acrylic polymer blend has an average $T_g$ of from −10° C. to 25° C.

15. A tire having an acrylic polymer film, which is the product of the process of claim 14.

* * * * *